(12) United States Patent
Lin et al.

(10) Patent No.: US 12,216,090 B2
(45) Date of Patent: Feb. 4, 2025

(54) ASSISTING DEVICE FOR BLADE DETECTION

(71) Applicant: Institute of Nuclear Energy Research, Atomic Energy Council, Executive Yuan, R.O.C., Taoyuan (TW)

(72) Inventors: Yu-Chu Lin, Taoyuan (TW); Wei-Nian Su, Taoyuan (TW)

(73) Assignee: Institute of Nuclear Energy Research, Atomic Energy Council, Executive Yuan, R. O.C., Taoyuan (TW)

( * ) Notice: Subject to any disclaimer, the term of this patent is extended or adjusted under 35 U.S.C. 154(b) by 577 days.

(21) Appl. No.: 17/585,653

(22) Filed: Jan. 27, 2022

(65) Prior Publication Data

US 2023/0160857 A1    May 25, 2023

(30) Foreign Application Priority Data

Nov. 25, 2021  (TW) ................................. 110144025

(51) Int. Cl.
| | | |
|---|---|---|
| *G01N 29/22* | (2006.01) | |
| *G01N 29/04* | (2006.01) | |
| *G01N 29/265* | (2006.01) | |
| *F03D 80/50* | (2016.01) | |

(52) U.S. Cl.
CPC ........... *G01N 29/225* (2013.01); *G01N 29/04* (2013.01); *G01N 29/265* (2013.01); *F03D 80/50* (2016.05); *G01N 2291/023* (2013.01); *G01N 2291/2694* (2013.01)

(58) Field of Classification Search
CPC .... G01N 29/225; G01N 29/04; G01N 29/265; G01N 2291/023; G01N 2291/2694; G01N 2291/2693; F03D 80/50; F03D 17/00; F05B 2270/8041
See application file for complete search history.

(56) References Cited

U.S. PATENT DOCUMENTS

| | | | | |
|---|---|---|---|---|
| 4,509,384 A | * | 4/1985 | Lamy ...................... | F16H 61/26 |
| | | | | 74/473.33 |
| 6,738,691 B1 | * | 5/2004 | Colgate .................. | B25J 9/1689 |
| | | | | 318/632 |

* cited by examiner

*Primary Examiner* — Suman K Nath
(74) *Attorney, Agent, or Firm* — Demian K. Jackson; Jackson IPG PLLC (57) ABSTRACT

A device is provided for blade detection. The device comprises a supporting frame, a linear track, and a fixture. The supporting frame comprises a plurality of aluminum extruded bodies with connectors thereof and a plurality of rotating adjusting pads with fixing plates thereof; the linear track comprises a plurality of tracks with connectors thereof and a plurality of sliders; and the fixture comprises a bearing holder part, a bearing connector, a sliding rod, a joint bearer with a connector thereof, a chuck, and a detector. On detecting a blade, the present invention helps the detector to be maintained on the blade surface for detection in horizontal and vertical directions without deviating from track; and the detector is in contact with the blade surface to move precisely and regularly without missing or repeating detection areas. Thus, the area is detected completely with time saved and accuracy improved.

9 Claims, 7 Drawing Sheets

ASSISTING DEVICE FOR BLADE DETECTION

TECHNICAL FIELD OF THE INVENTION

The present invention relates to blade detection; more particularly, to a tool assisting the blade inspection, where a detector is in contact with the blade surface to move precisely and regularly thereon without missing or repeating detection areas while the detection areas are detected completely with operating time saved and detection accuracy improved.

DESCRIPTION OF THE RELATED ARTS

Nowadays, the operation and maintenance of wind farm mainly use visual and manual percussions for detecting wind turbine blades. But it can only distinguish the damage on blade surface. In this regard, the market has now successively developed non-destructive technologies for blade detection, such as ultrasonic detection, infrared imaging detection and thermal imaging detection. These types of detection are mostly operated through using detecting tools held by people. For a large blade, how to move accurately and regularly on the surface of a large area is an important problem to be solved.

After constructing a great number of wind farms, blade detection needs to be introduced into the operation and maintenance project for maintaining the operation and maintenance of the wind farms. As a result, although the non-destructive detection of ultrasonic wave is generally used on the market for blade detection, technical shortcomings of the availability, stability and operational efficiency of wind turbines need to be improved.

Hence, the prior art does not fulfill all users' requests on actual use.

SUMMARY OF THE INVENTION

The main purpose of the present invention is to help maintaining a detector on a blade surface for straight-line detection (in longitudinal and lateral directions) without deviating from straight-moving on track, where the detector is in contact with the blade surface to move precisely and regularly thereon without missing or repeating detection areas for detecting the detection areas completely with operating time saved and detection accuracy improved.

Another purpose of the present invention is to, after constructing a great number of wind farms, assist a wind farm operator on blade detection and maintenance for providing the judgment on continuously using or just replacing the blade, where criteria of blade detection cycle and detection procedure are set step by step to be preliminarily applied to land-based wind farms and gradually applied to offshore wind farms for establishing independent technologies and improving the availability of wind turbines and the stability and operating efficiency of wind farms.

To achieve the above purposes, the present invention is a device for assist in blade detection, comprising a supporting frame, a linear track, and a fixture, where the supporting frame is placed on a surface of a blade; the supporting frame comprises a plurality of aluminum (Al) extruded frames and a plurality of adjustment rotating pads; an Al extruded connector is used to connect each adjacent two of the Al extruded frames; each of the adjustment rotating pads is set on one of the Al extruded frames through a pad fixing plate; each of the adjustment rotating pads has a thread and a bottom for a plurality of adjustment operations; each of the adjustment rotating pads is adjusted based on a curvature of a surface of the blade to have the bottom of each of the adjustment rotating pads be in close contact with the surface of the blade and accordingly adjust a height of the one of the Al extruded frames above the supporting frame; the linear track comprises a plurality of sub-tracks and a plurality of sliders; a track connector is used to connect each adjacent two of the sub-tracks; each of the sub-tracks is in being disposed in a fixed position, moving longitudinally, or moving laterally; each of the sliders moves linearly on one of the sub-tracks to assist maintaining a detector on the surface of the blade to operate a longitudinal linear detection or a lateral linear detection without deviating from straight-moving on track; the fixture is fixed to one of the sliders with a bolt to freely move the fixture to a position for operating detection of the blade; the fixture comprises a bearing seat, a bearing connector, a sliding rod, a joint bearing, a chuck, and the detector; and the fixture has three freedoms, comprising swivel-pair freedom, sliding-pair freedom, and ball-facing freedom, to have the detector be in contact with the surface of the blade for operating the detection of the blade. Accordingly, a novel device for assist in blade detection is obtained.1

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 7, which are a view showing a preferred embodiment according to the present invention; a view showing a supporting frame and linear tracks; a view showing a fixture; a view showing the freedoms of Al extruded frames, sub-tracks, and fixtures; a view showing detection paths; a view showing the freedoms of a fixture; and a view showing the adjustability of components. As shown in the figures, the present invention is a device for assist in blade detection, comprising a supporting frame 1, a linear track 2, and a fixture 3.

Figure 1:
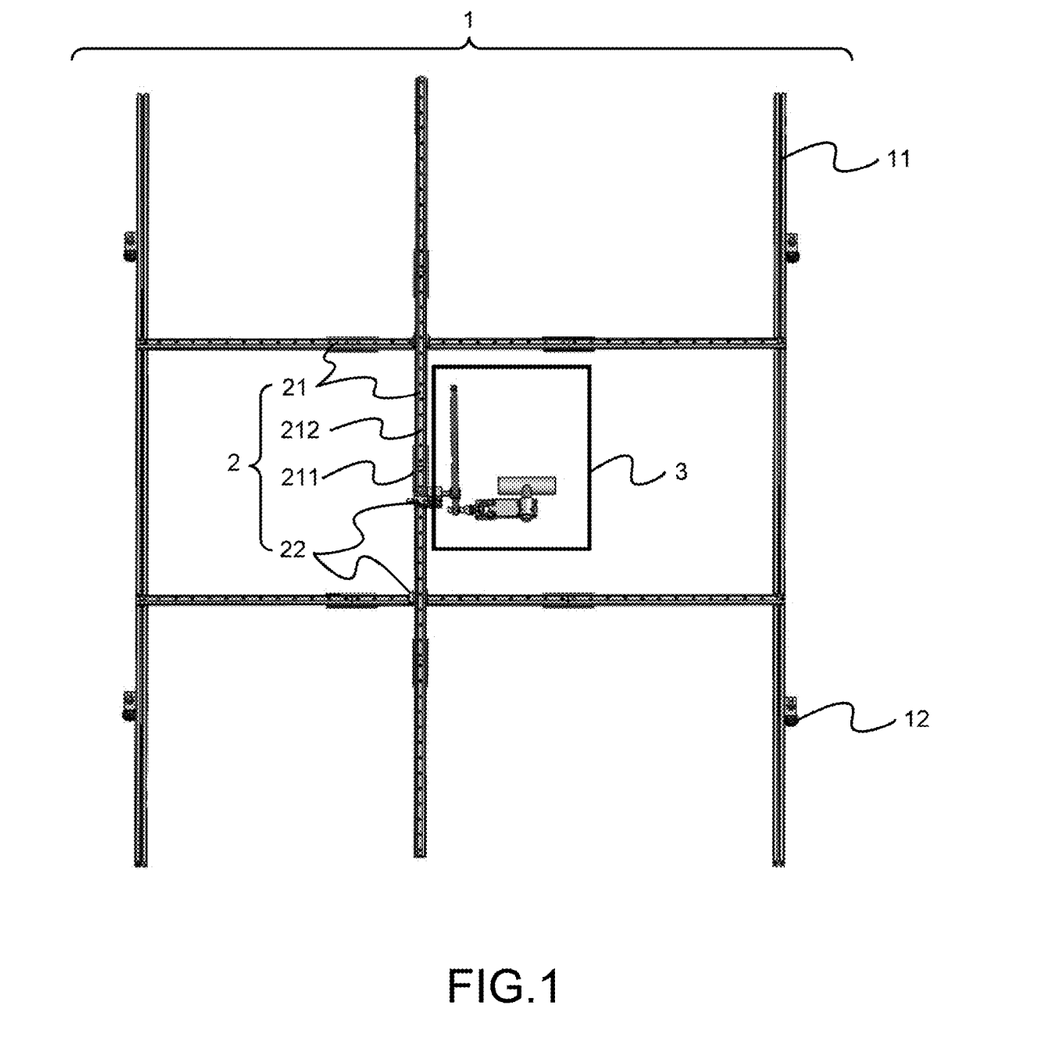
FIG. 1 is the view showing the preferred embodiment according to the present invention.
Figure 2:
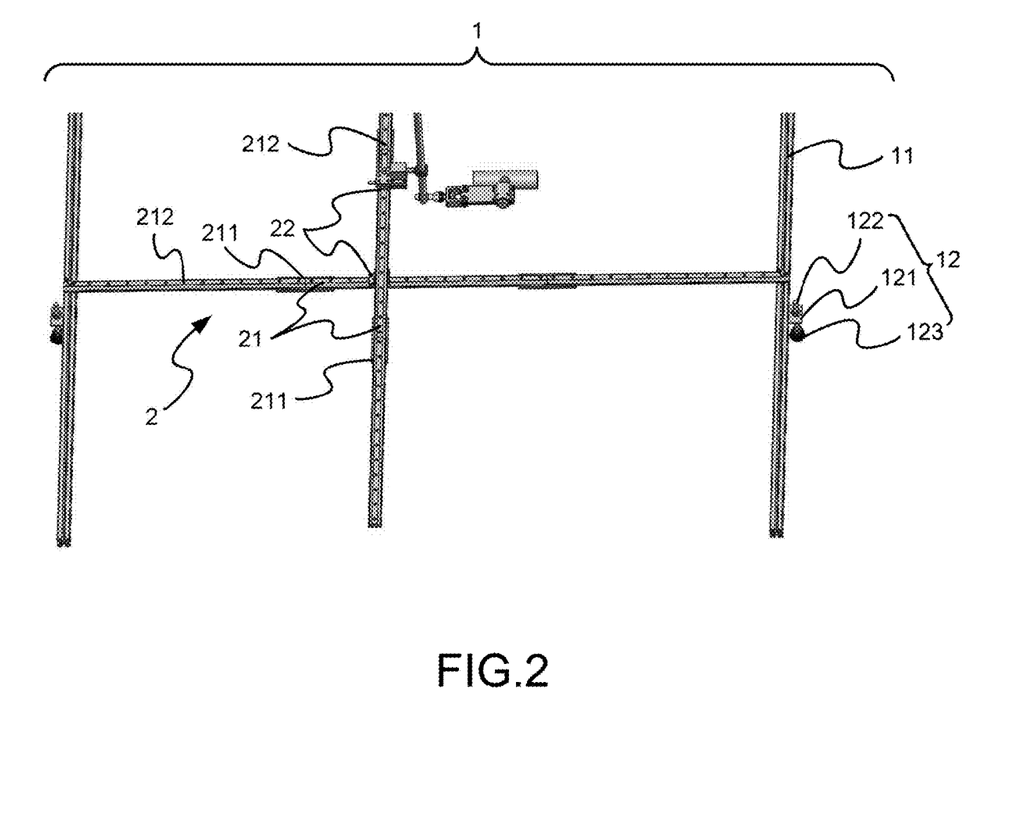
FIG. 2 is the view showing the supporting frame and the linear tracks.

The supporting frame 1 is placed on a surface of a blade (not shown in the figure). As shown in FIG. 2, the supporting frame 1 comprises a plurality of Al extruded frame 11 and a plurality of adjustment rotating pad 12. An Al extruded connector (not shown in the figure) is used to connect each adjacent two of the Al extruded frames 11. The supporting frame 1 comprises a number of the Al extruded frames 11 based on requests with each adjacent two thereof connected via the Al extruded connector to adjust a size of the supporting frame 1 based on required composition. Besides, a distance between two of the Al extruded frame 11 at any different positions in the support frame 1 is adjustable. Each of the adjustment rotating pads 12 is set on one of the Al extruded frames 11 through a pad fixing plate 121, where the positions and number of the adjustment rotating pads 12 are adjusted based on actual needs. Each of the adjustment rotating pads 12 has a thread 122 and a bottom 123, where a distance between the bottom 123 of each of the adjustment rotating pads 12 and each of the Al extruded frame 1 is self-adjusted; and an angle between the bottom 123 and the thread 122 of each of the adjustment rotating pads 12 is adjusted (ball-facing freedom). Through the above three operations, each of the adjustment rotating pads 12 is adjusted based on a curvature of the surface of the blade to have the bottom 123 of each of the adjustment rotating pads 12 be in close contact with the surface of the blade and accordingly adjust a height of the one of the Al extruded frames 11 above the supporting frame 1.

Figure 3:
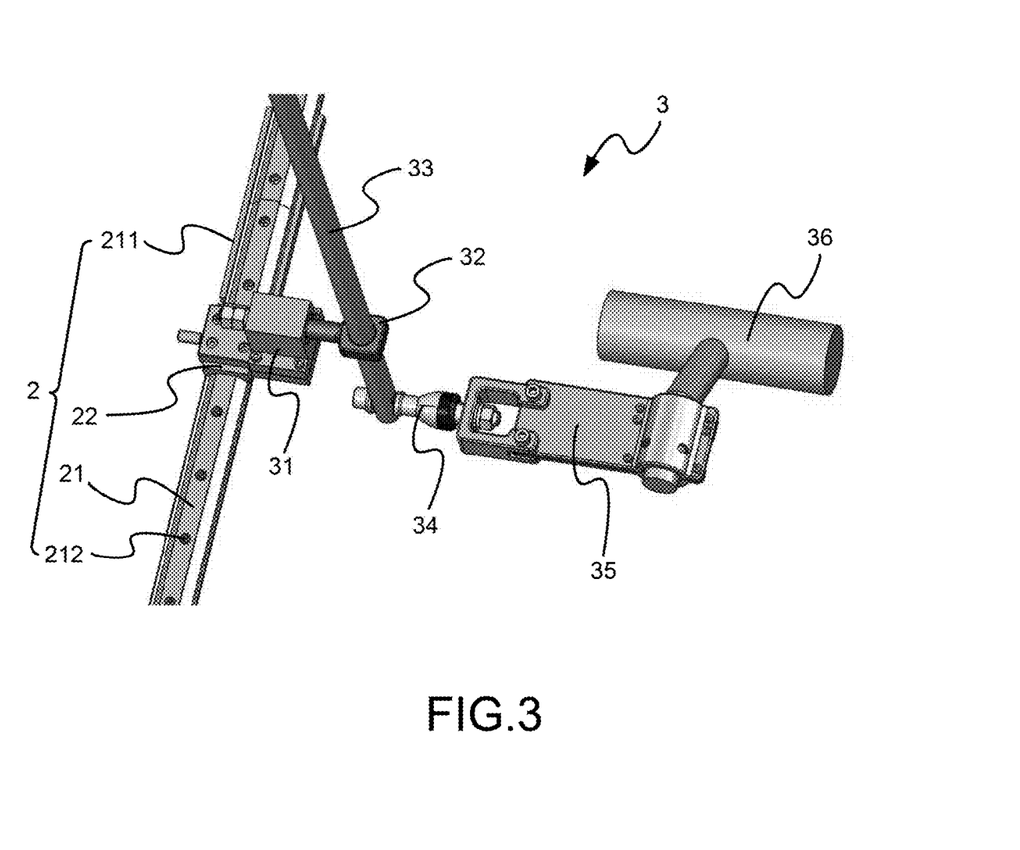
FIG. 3 is the view showing the fixture.
Figure 4:
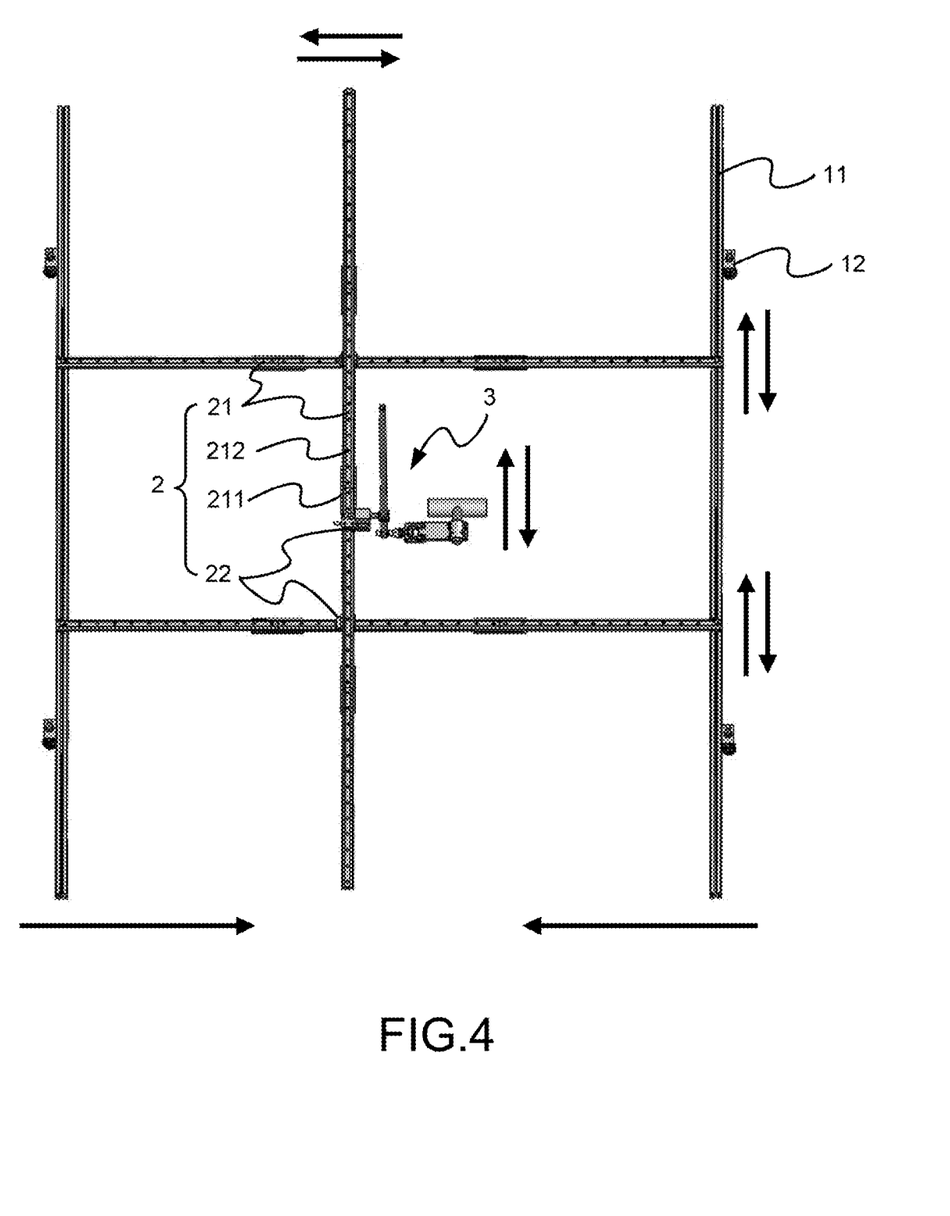
FIG. 4 is the view showing the freedoms of the aluminum (Al) extruded frame, the sub-track, and the fixture.
Figure 5:
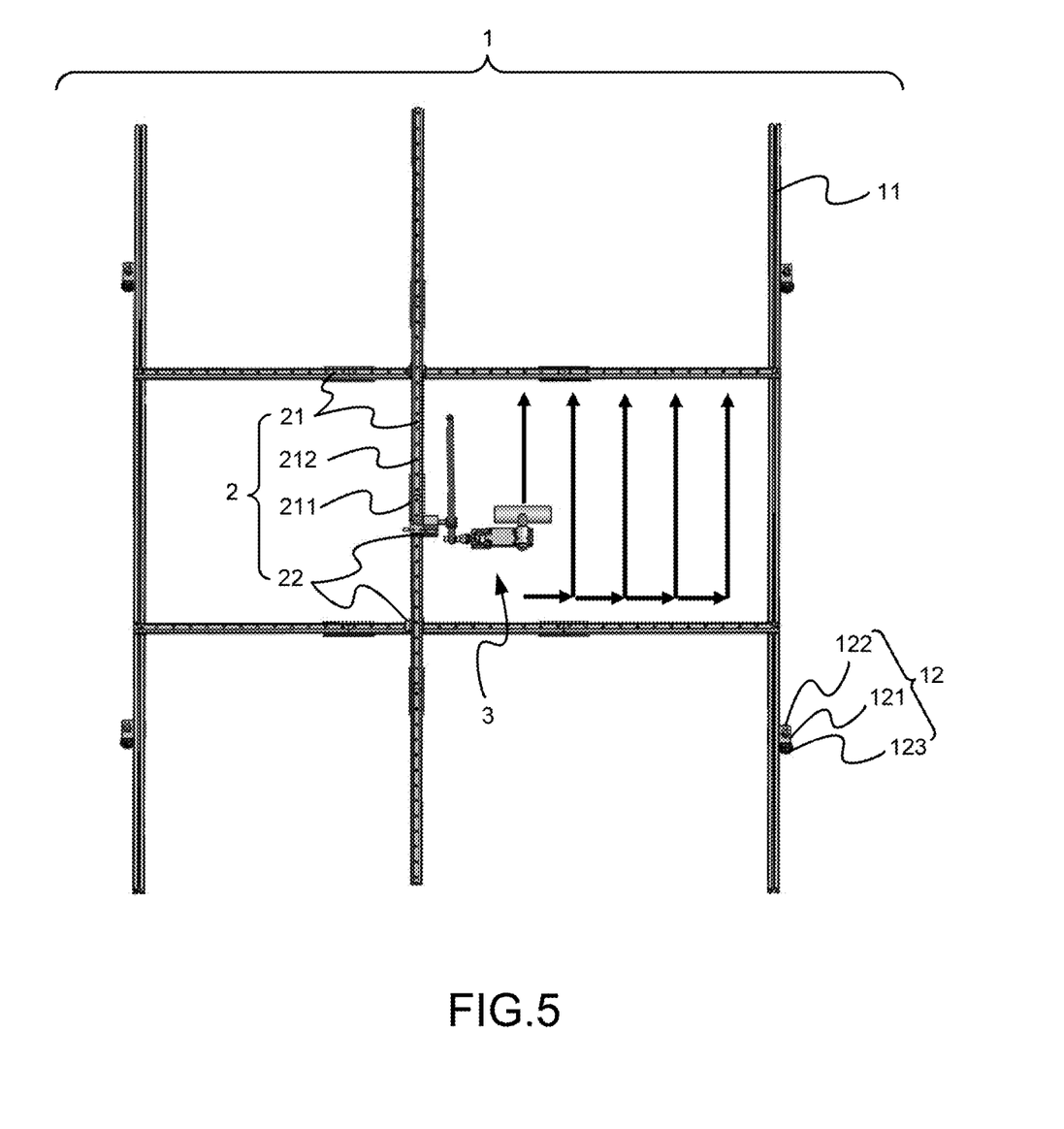
FIG. 5 is the view showing the detection paths.

The linear track 2 comprises a plurality of sub-tracks 21 and a plurality of sliders 22, where a track connector 211 is used to connect each adjacent two of the sub-tracks 21; the linear track 2 comprises a number of the sub-tracks 21 bases on requests with each adjacent two thereof connected via at least one of the track connector 211 to adjust a length of the linear track 2 based on required composition; and each of the sub-tracks 21 has a plurality of holes 212 evenly disposed and equally spaced that, with one of the holes 212 being used to connect to the supporting frame 1, a connecting position of the linear track 3 is adjusted based on requests. As shown in FIG. 4, each of the sub-tracks 21 is a longitudinal sub-track or a lateral sub-track, being disposed in a fixed position, moving longitudinally, or moving laterally; and each of the sliders 22 moves linearly on one of the sub-tracks 21. The fixture 3 is fixed to one of the sliders 22 to freely move the fixture 3 to a position for operating detection of the blade. As shown in FIG. 5, the present invention assists in maintaining a detector on the surface of the blade to operate a longitudinal or lateral linear detection without deviating from straight-moving on track, where the fixture 3 is fixed to one of the sliders 22 with a bolt. As shown in FIG. 3, the fixture 3 comprises a bearing seat 31, a bearing connector 32, a sliding rod 33, a joint bearer 34 with a connector (not shown in the figure) thereof, a chuck 35, and the detector 36. The bearing seat 31 is fixed on the one of the sliders 22 with the bolt; the bearing connector 32 is connected to the bearing seat 31 with swivel-pair freedom formed; the sliding rod 33 passes through the bearing connector 32 with sliding-pair freedom formed; an end of the joint bearing 34 is fixed to a bottom end of the sliding rod 33 with a nut; and the chuck 35 is fixed to another end of the joint bearing 34 with a bolt with the detector 36 fixed to the chuck 35 to have the detector 36 and the chuck 35 form ball-facing freedom with the sliding rod 33. Thus, as is described above, the fixture 3 has three freedoms, comprising the swivel-pair freedom, the sliding-pair freedom, and the ball-facing freedom, as shown in FIG. 6, to have the detector 36 in contact with the blade surface for detection.

Thus, a novel device for assist in blade detection is obtained.

Figure 7:
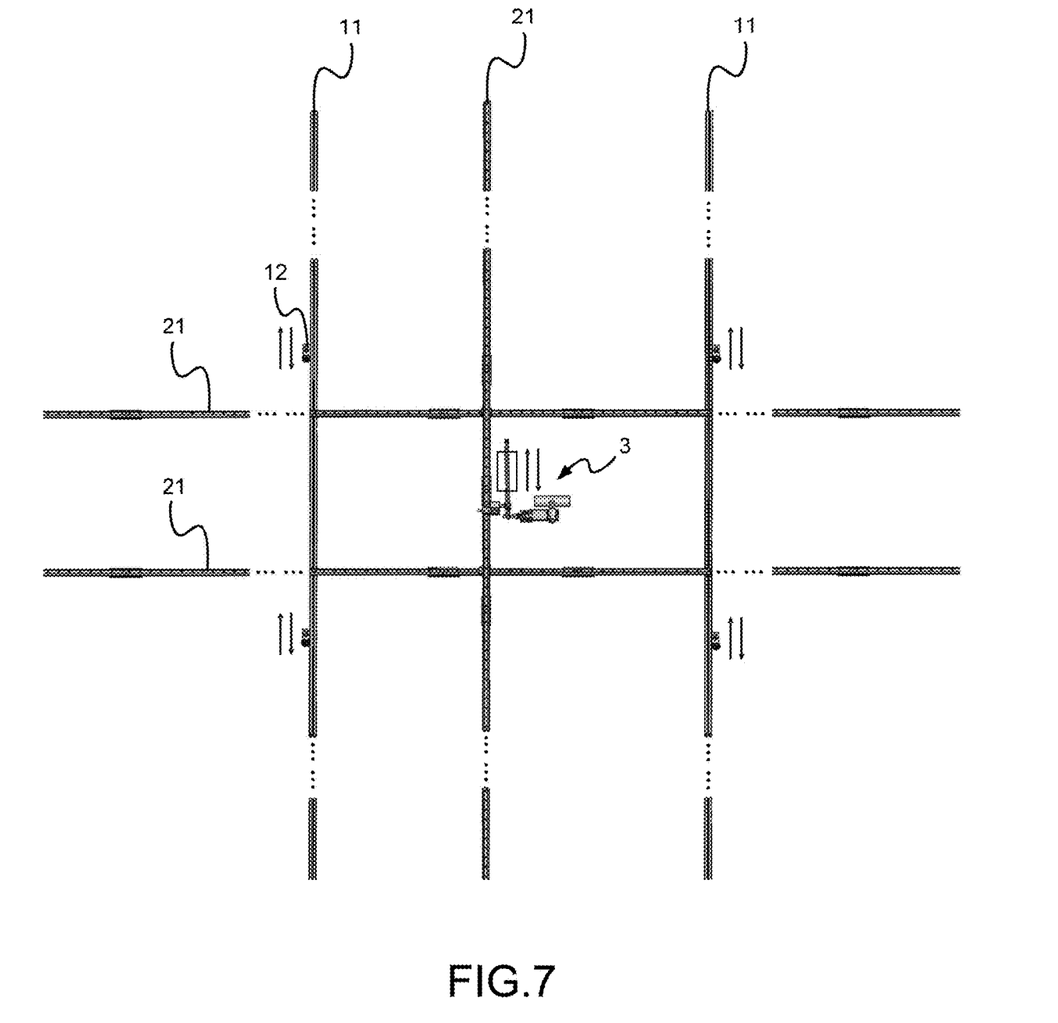
FIG. 7 is the view showing the adjustability of the components.

As shown in FIG. 7, the lengths of the supporting frame 1 and the linear track 2 are adjustable; and connected to a new Al extruded frame 11 or a sub-track 21 to extend the initial positioning for avoiding positioning errors owing to moving the detector 36. Thus, the data obtained during the detection have relative positions as being correct and continuous to aid in following data analysis and correctness. At the same time, for the height of the adjustment rotating pad is adjustable, the height of the sliding rod 33 is also changeable, where the fixture 3 has three freedoms, comprising swivel-pair freedom, sliding-pair freedom, and ball-facing freedom, so that the blade may have a size adjustable with its blade surface having curvature also adjustable.

Figure 6:
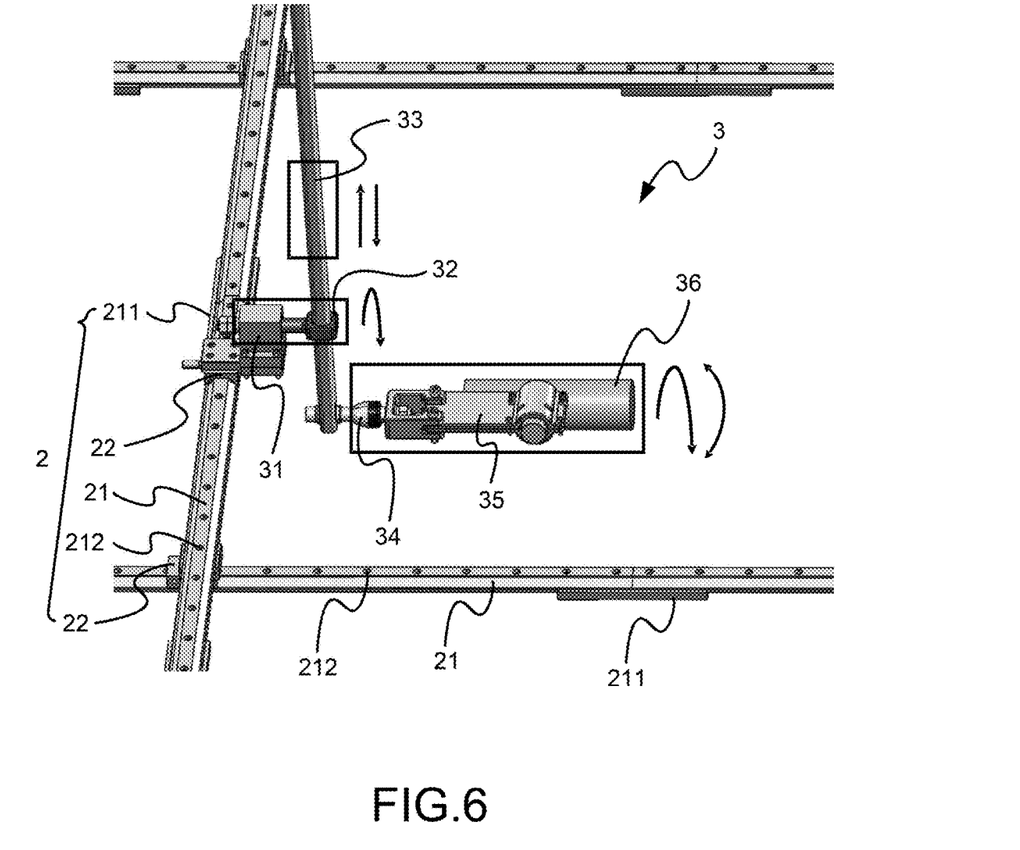
FIG. 6 is the view showing the freedoms of the fixture.

On detecting the blade as shown in FIG. 4-FIG. 6, the present invention is used to help the detector to be maintained on the blade surface for straight line detection (in longitudinal and lateral directions) without deviating from straight-moving on track, where the detector is in contact with the blade surface to move precisely and regularly thereon without missing or repeating detection areas for detecting the detection areas completely while operating time is saved and detection accuracy is improved.

As being implemented practically, after constructing a great number of wind farms, the present invention assists a wind farm operator in blade detection and maintenance for providing the judgment on continuously using or just replacing the blade. Criteria of blade detection cycle and detection procedure are set step by step to be preliminarily applied to land-based wind farms and gradually applied to offshore wind farms. Independent technologies are thus established with the availability of wind turbines and the stability and operating efficiency of wind farms both improved.

To sum up, the present invention is a device for assist in blade detection, where the present invention mainly assists a rolling ultrasonic detector in accurately moving on a prescribed route for detection with precise positioning; the detector moves vertically and horizontally without missing or repeating detection areas; and the detection areas are detected completely with operating time saved and detection accuracy improved.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device for assist in blade detection, comprising
a supporting frame,
wherein said supporting frame is disposed on a surface of a blade; said supporting frame comprises a plurality of aluminum (Al) extruded frames and a plurality of adjustment rotating pads; an Al extruded connector is obtained to connect each adjacent two of said Al extruded frames; each of said adjustment rotating pads is disposed on one of said Al extruded frames through a pad fixing plate; and each of said adjustment rotating pads has a thread and a bottom to obtain a plurality of adjustment operations, wherein each of said adjustment rotating pads is adjusted based on a curvature of a surface of said blade to have said bottom of each of said adjustment rotating pads be in close contact with said surface of said blade and accordingly adjust a height of said one of said Al extruded frames above said supporting frame;
a linear track,
wherein said linear track comprises a plurality of sub-tracks and a plurality of sliders; a track connector is obtained to connect each adjacent two of said sub-tracks; each of said sub-tracks is in a state selected from a group consisting of a state of being disposed in a fixed position, a state of moving longitudinally, and a state of moving laterally; and each of said sliders moves linearly on one of said sub-tracks to assist maintaining a detector on said surface of said blade to operate a linear detection selected from a group consisting of a longitudinal linear detection and a lateral linear detection without deviating from straight-moving on track; and a fixture,
  wherein said fixture is fixed to one of said sliders with a bolt to freely move said fixture to a position to operate detection of said blade; said fixture comprises a bearing seat, a bearing connector, a sliding rod, a joint bearing, a chuck, and said detector; and said fixture has three freedoms, comprising swivel-pair freedom, sliding-pair freedom, and ball-facing freedom, to have said detector be in contact with said surface of said blade to operate said detection of said blade.

2. The device according to claim 1,
wherein said supporting frame comprises a plurality of said Al extruded frames with each adjacent two thereof connected via said Al extruded connector to adjust a size of said supporting frame.

3. The device according to claim 1,
wherein a distance between two of said aluminum extruded frame at any different positions in said support frame is adjustable.

4. The device according to claim 1,
wherein said adjustment operations comprises an operation of adjusting positions and numbers of said adjustment rotating pads; an operation of self-adjusting a distance between said bottom of each of said adjustment rotating pads and each of said aluminum extruded frame; and an operation of adjusting an angle between said bottom and said thread of each of said adjustment rotating pads.

5. The device according to claim 1,
wherein said linear track comprises a plurality of said sub-tracks with each adjacent two thereof connected via said track connector to adjust a length of said linear track.

6. The device according to claim 1,
wherein each of said sub-tracks has a plurality of holes evenly disposed and equally spaced that, with one of said holes being used to connect to said supporting frame, a connecting position of said linear track is adjusted.

7. The device according to claim 1,
wherein each of said sub-tracks is selected from a group consisting of a longitudinal sub-track and a lateral sub-track.

8. The device according to claim 1,
wherein said bearing seat is fixed on said one of said sliders with said bolt; said bearing connector is connected to said bearing seat with said swivel-pair freedom obtained; said sliding rod passes through said bearing connector with said sliding-pair freedom obtained; an end of said joint bearing is fixed to a bottom end of said sliding rod with a nut; and said chuck is fixed to another end of said joint bearing with a bolt with said detector fixed to said chuck to have said detector and said chuck being face-turned to said sliding rod with said ball-facing freedom obtained.

9. The device according to claim 1,
wherein said blade has a size adjustable and said surface of said blade has said curvature adjustable.

\* \* \* \* \*